United States Patent
Shih et al.

(10) Patent No.: US 8,952,937 B2
(45) Date of Patent: *Feb. 10, 2015

(54) RESISTIVE TOUCH PANEL DISPLAY DEVICE USING CARBON NANOTUBES

(75) Inventors: Po-Sheng Shih, New Taipei (TW); Chien-Yung Cheng, New Taipei (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 143 days.

This patent is subject to a terminal disclaimer.

(21) Appl. No.: 13/248,492

(22) Filed: Sep. 29, 2011

(65) Prior Publication Data

US 2012/0280945 A1    Nov. 8, 2012

(30) Foreign Application Priority Data

May 2, 2011    (TW) .............................. 100115301 A

(51) Int. Cl.
*G06F 3/045*   (2006.01)
*G06F 3/041*   (2006.01)

(52) U.S. Cl.
USPC ......... 345/178; 345/174; 345/173; 178/18.05

(58) Field of Classification Search
USPC ................... 345/173–175, 178, 88, 211, 589;
73/862.041; 324/686; 428/114, 292.1;
248/346.5; 178/18.01–20.04
See application file for complete search history.

(56) References Cited

U.S. PATENT DOCUMENTS 7,158,121 B2 *   1/2007   Krajewski et al. ............ 345/173
7,973,778 B2 *   7/2011   Chen .............................. 345/175
8,049,738 B2 *  11/2011   Philipp .......................... 345/174
8,211,267 B2 *   7/2012   Lin et al. ....................... 156/296
2003/0076307 A1  4/2003   Krajewski et al.

(Continued)

FOREIGN PATENT DOCUMENTS

TW   200917947   4/2009
TW   201102906   1/2011

OTHER PUBLICATIONS

S. Widnall, 16.07 Dynamics Fall 2009 Lecture Notes based on J. Peraire version 2.0, Fall 2009, MIT, http://ocw.mit.edu/courses/aeronautics-and-astronautics/16-07-dynamics-fall-2009/lecture-notes/MIT16_07F09_Lec03.pdf.*

*Primary Examiner* — Dwayne Bost
*Assistant Examiner* — Darlene M Ritchie
(74) *Attorney, Agent, or Firm* — Novak Druce Connolly Bove + Quigg LLP

(57) ABSTRACT

A touch display device includes a touch panel, a driving and sensing circuit, a data memory, a processor and a display apparatus. The touch panel is adapted to receive a touch trace including at least one touch point. The driving and sensing circuit is adapted to detect an actual signal value $V_i$ of the at least one touch point. The data memory is adapted to store a look up table including a plurality of position coordinates and calibrating rules f each corresponding to each of the position coordinates and can be used to convert actual signal value $V_{0i}$ of a basic contact area $A_0$ to a standard signal value $V_s$. The processor is adapted to calculate the position coordinate and calibrate the actual signal value $V_i$ to a calibrated signal value $V'_i$. The display apparatus is adapted to display the touch trace.

19 Claims, 13 Drawing Sheets

(56) References Cited

U.S. PATENT DOCUMENTS

| | | | |
|---|---|---|---|
| 2004/0178997 A1* | 9/2004 | Gillespie et al. | 345/173 |
| 2004/0207606 A1* | 10/2004 | Atwood et al. | 345/173 |
| 2008/0252616 A1* | 10/2008 | Chen | 345/175 |
| 2008/0296073 A1 | 12/2008 | McDermid | |
| 2009/0092813 A1 | 4/2009 | Lin et al. | |
| 2010/0079391 A1* | 4/2010 | Joung, II | 345/173 |
| 2011/0157083 A1* | 6/2011 | Hershman et al. | 345/174 |
| 2011/0242046 A1* | 10/2011 | Feng et al. | 345/174 |
| 2012/0026124 A1* | 2/2012 | Li et al. | 345/174 |
| 2012/0062512 A1* | 3/2012 | Cheng et al. | 345/174 |
| 2012/0075235 A1* | 3/2012 | Hong et al. | 345/174 |
| 2012/0086666 A1* | 4/2012 | Badaye et al. | 345/174 |
| 2012/0212425 A1* | 8/2012 | Schmidt et al. | 345/173 |
| 2013/0115439 A1* | 5/2013 | Wang et al. | 428/292.1 |

* cited by examiner ated to store a look up table. The look up table includes a plurality of position coordinates on the touch panel 104 and a plurality of calibrating rules f, each corresponding to each of the plurality of the position coordinates. Each of the plurality of calibrating rules f can be used to convert an actual signal value ($V_{0i}$) of the at least one touch point of a basic contact area ($A_0$) in its position coordinate to a standard signal value ($V_s$). The converting process can be represented by $f(V_{0i})=V_s$. The processor 112 is adapted to calculate the position coordinate and calibrate the actual signal value ($V_i$) of the at least one touch point to a calibrated signal value ($V'_i$) by each corresponding calibrating rule f. The calibrating process can be represented by $f(V_i)=V'_i$. The display apparatus 114 is adapted to display the touch trace according to the position coordinate and the calibrated signal value ($V'_i$) of the at least one touch point calculated by the processor 112.

RESISTIVE TOUCH PANEL DISPLAY DEVICE USING CARBON NANOTUBES

This application claims all benefits accruing under 35 U.S.C. §119 from Taiwan Patent Application No. 100115301, filed on May 2, 2011, in the Taiwan Intellectual Property Office, the contents of which are hereby incorporated by reference. This application is related to commonly-assigned applications entitled, "TOUCH INPUT DEVICE", filed on Sep. 29, 2011, and application Ser. No. 13/248,511; and "METHOD FOR DETECTING TOUCH TRACE BASED ON RESISTIVE TOUCH PANEL", filed on Sep. 29, 2011, and application Ser. No. 13/248,447.

BACKGROUND

1. Technical Field

The present disclosure relates to a touch display device.

2. Description of Related Art

Typically, touch detection can only detect touches on a touch device. The touch device and methods cannot detect sizes of the touch points or brush strokes operated and cannot differentiate the pressure of the touches.

For example, traditional handwriting recognition devices usually record handwritings operated on the input devices. The handwritings are recognized by using handwriting recognition systems, and the handwritings are displayed with predetermined types and sizes. The recognition may not embody the handwriting style of users. It is difficult to personalize electronic signatures or create complex electronic painting because the traditional recognition system cannot detect users' brush strokes and touch pressure.

What is needed, therefore, is to provide a touch display device that can represent brush strokes and touch pressure of touch traces operated thereon.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
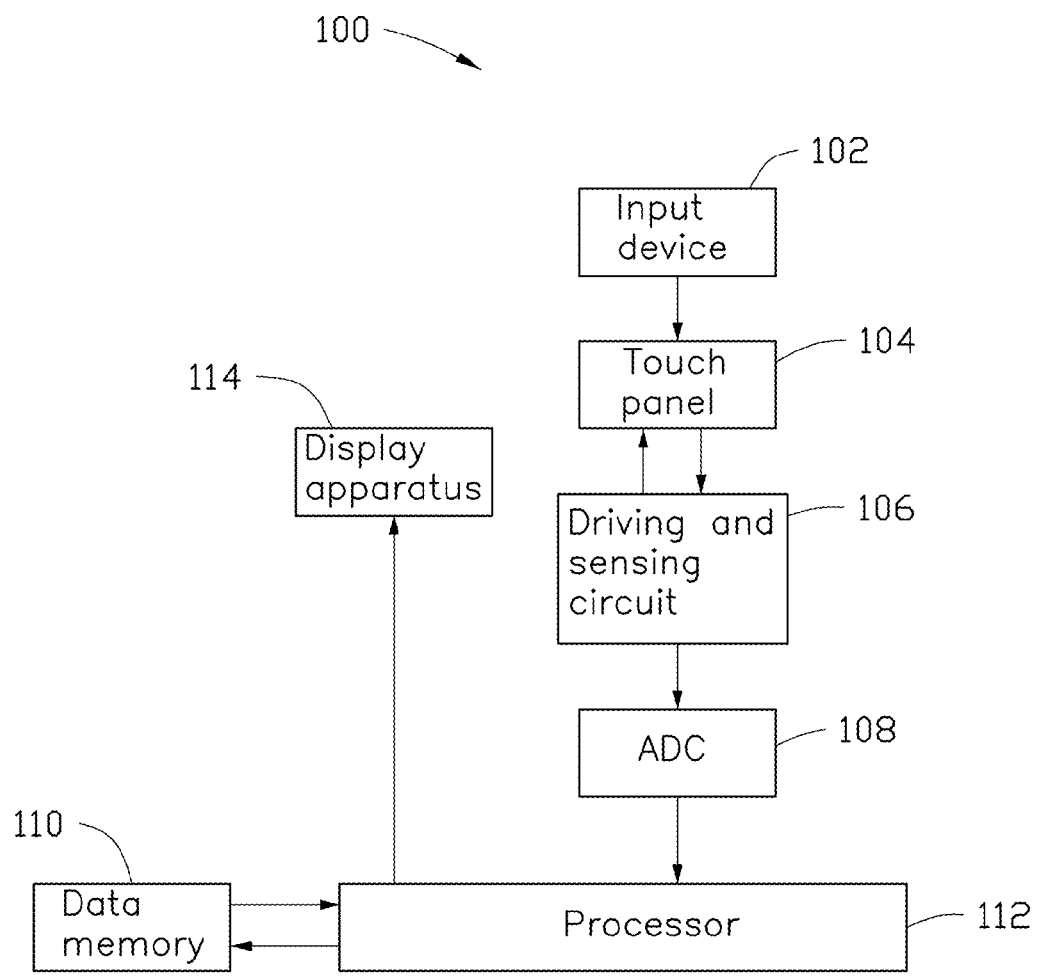
FIG. 1 is a block diagram of an embodiment of a touch display device.

Referring to FIG. 1, one embodiment of a touch display device 100 includes a touch panel 104, a driving and sensing circuit 106, a data memory 110, a processor 112, and a display apparatus 114. The touch panel 104 is adapted to receive a touch trace. The touch trace includes at least one touch point. The touch trace can consist of a plurality of successive touch points. The driving and sensing circuit 106 is adapted to drive the touch panel 104 and detect at least one actual signal value ($V_i$) of the at least one touch point. The data memory 110 is adapted to store a look up table. The look up table includes a plurality of position coordinates on the touch panel 104 and a plurality of calibrating rules f, each corresponding to each of the plurality of the position coordinates. Each of the plurality of calibrating rules f can be used to convert an actual signal value ($V_{0i}$) of the at least one touch point of a basic contact area ($A_0$) in its position coordinate to a standard signal value ($V_s$). The converting process can be represented by $f(V_{0i})=V_s$. The processor 112 is adapted to calculate the position coordinate and calibrate the actual signal value ($V_i$) of the at least one touch point to a calibrated signal value ($V'_i$) by each corresponding calibrating rule f. The calibrating process can be represented by $f(V_i)=V'_i$. The display apparatus 114 is adapted to display the touch trace according to the position coordinate and the calibrated signal value ($V'_i$) of the at least one touch point calculated by the processor 112.

Figure 2:
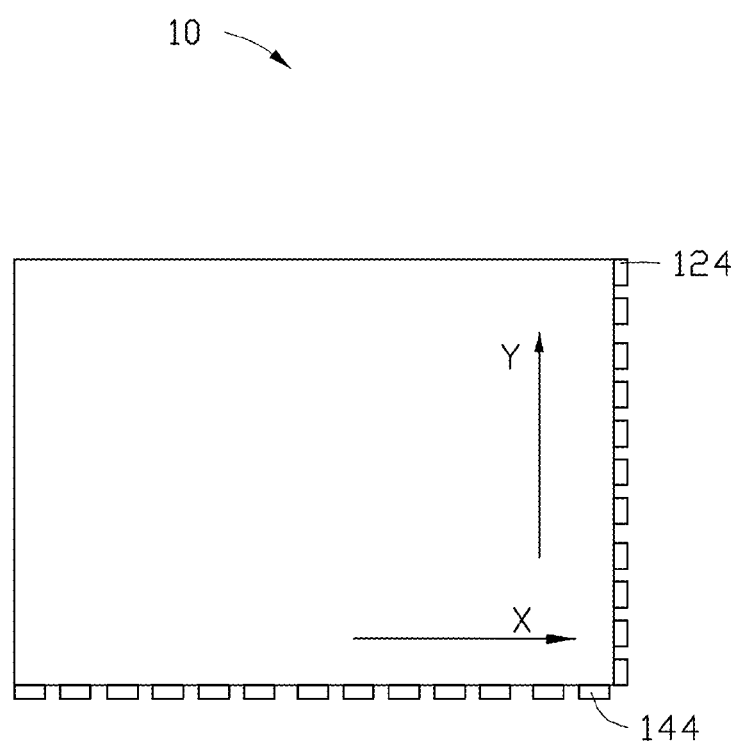
FIG. 2 is a schematic top view of an embodiment of a structure of a resistive touch panel applicable to the touch display device.
Figure 3:
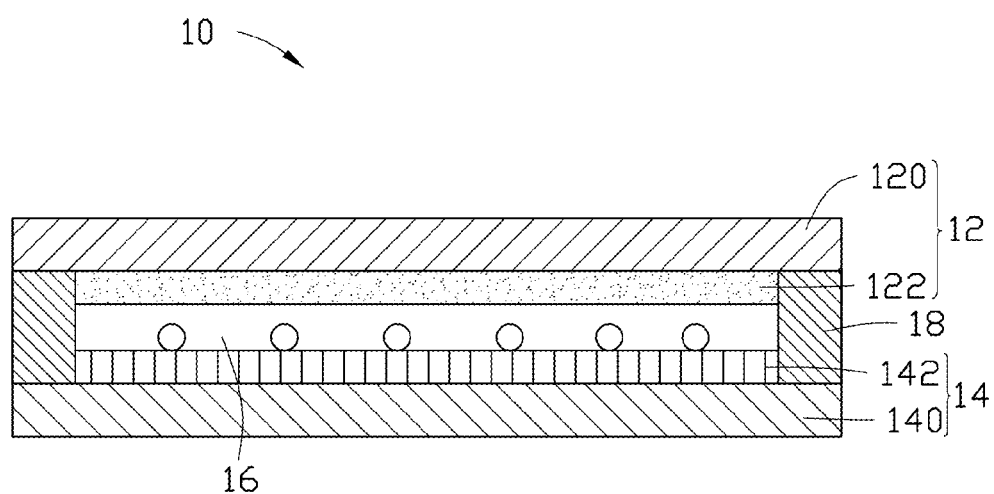
FIG. 3 is a cross-sectional view of a side view of the structure of the resistive touch panel.
Figure 4:
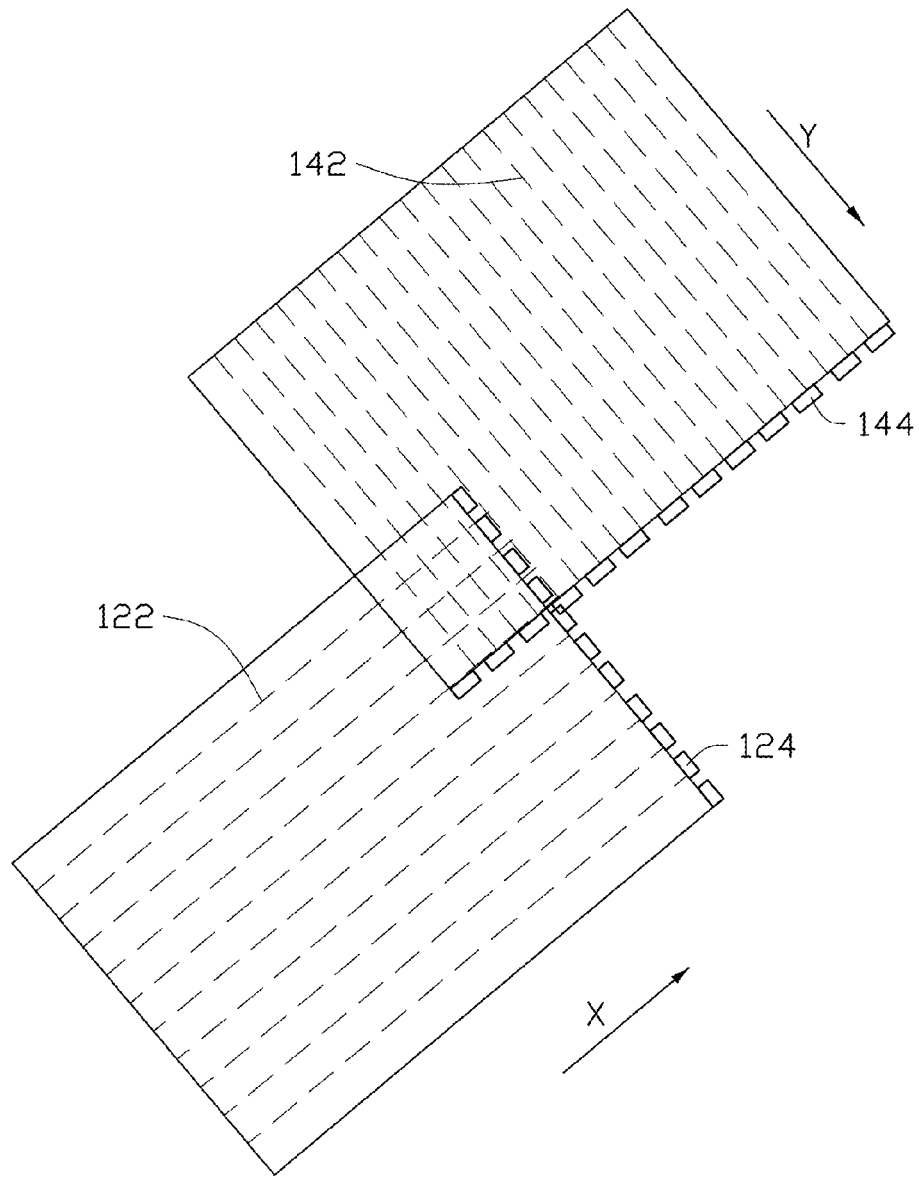
FIG. 4 is a schematic view of a first conductive layer and a second conductive layer of the resistive touch panel.

Referring to FIG. 2 to FIG. 4, the touch panel 104 can be a resistive touch panel 10. In one embodiment, the resistive touch panel 10 can support multi-touch. The resistive touch panel 10 includes a first electrode plate 12, a second electrode plate 14, and a plurality of dot spacers 16 located between the first electrode plate 12 and the second electrode plate 14.

The first electrode plate 12 includes a first substrate 120, a first conductive layer 122, and a plurality of first electrodes 124. The first conductive layer 122 and the plurality of first electrodes 124 are located on a surface of the first substrate 120 near the plurality of dot spacers 16. A first direction and a second direction are defined. The second direction can be perpendicular to the first direction. In one embodiment, X direction is defined as the first direction, and Y direction is defined as the second direction. In one embodiment, the plurality of first electrodes 124 are separately located on and electrically connected with one end along the Y direction of the first conductive layer 122.

In another embodiment, the plurality of first electrodes 124 are separately located on and electrically connected with two opposite ends of the first conductive layer 122 extending along the Y direction.

The second electrode plate 14 includes a second substrate 140, a second conductive layer 142, and a plurality of second electrodes 144. The second conductive layer 142 and the plurality of second electrodes 144 are located on a surface of the second substrate 140 near the plurality of dot spacers 16. In one embodiment, the second electrodes 144 are separately located on and electrically connected with one end along the X direction of the second conductive layer 144.

In another embodiment, the plurality of second electrodes 144 are separately located on and electrically connected with two opposite ends of the second conductive layer 142 extending along the X direction.

In one embodiment, the resistive touch panel 10 can further include an insulative layer 18 located sandwiched between the first and second substrate and located at the two ends of the first and second conductive layers. The first conductive layer 122 and the second conductive layer 142 can be electrically isolated by the insulative layer 18 and the dot spacers when the resistive touch panel 10 is not touched.

The first conductive layer 122 and the second conductive layer 142 can be a transparent and anisotropic conductive film. Conductivity in one direction of the anisotropic conductive film is much larger than conductivities in all the other directions. The anisotropic conductive film can be at least one carbon nanotube film. The at least one carbon nanotube film includes a plurality of carbon nanotubes. The plurality of carbon nanotubes is substantially oriented along a same direction. The conductivity along the oriented direction of the plurality of carbon nanotubes is much larger than the conductivities along other directions. It is to be understood that the carbon nanotube film is conductive along any direction. The carbon nanotube film along the direction perpendicular to the oriented direction of the carbon nanotubes is also conductive.

The at least one carbon nanotube film can be a carbon nanotube drawn film formed by drawing a carbon nanotube array. A majority of the carbon nanotubes in the carbon nanotube drawn film extend substantially along the same direction and are parallel to a surface of the carbon nanotube drawn film. An end of each carbon nanotube in the majority of the carbon nanotubes is joined to another end of an adjacent carbon nanotube arranged substantially along the same direction by van der Waals attractive force. A minority of carbon nanotubes in the carbon nanotube drawn film can be randomly arranged, and has a small or negligible effect on the majority of carbon nanotubes arranged substantially along the same direction.

The carbon nanotube drawn film is capable of forming a free-standing structure. The term "free-standing structure" can be defined as a structure that does not need to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintains film structural integrity. The free-standing structure of the carbon nanotube drawn film is realized by the successive carbon nanotubes joined end to end by Van der Waals attractive force.

There can be substantially uniform gaps formed between the carbon nanotubes in the carbon nanotube drawn film. A width of each gap can be in a range from about 1 nanometer to about 10 micrometers.

Figure 5:
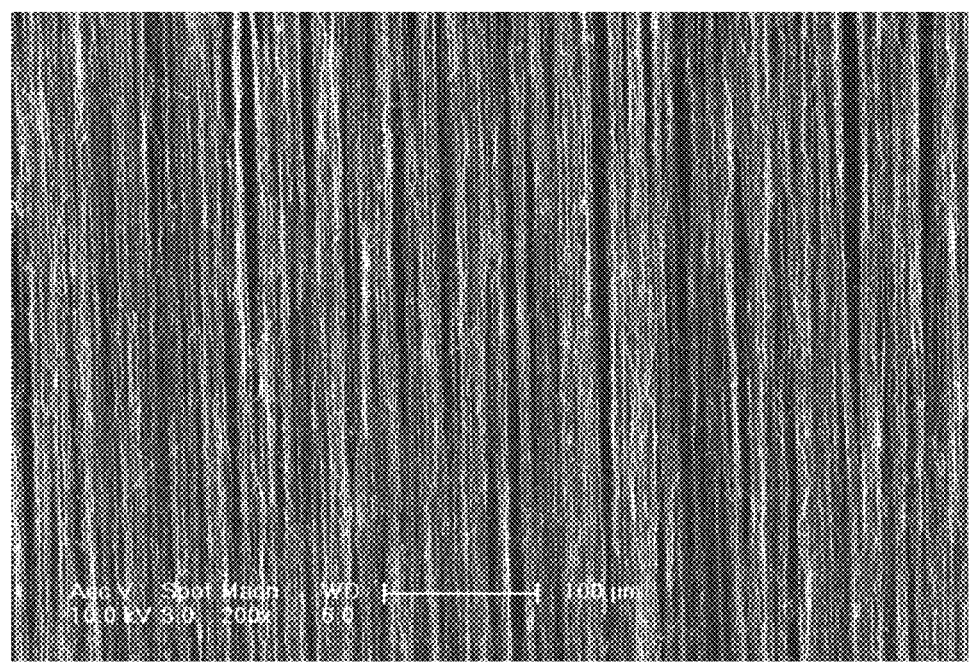
FIG. 5 shows a Transmission Electron Microscope (TEM) image of a carbon nanotube film used as the first conductive layer and the second conductive layer.
Figure 6:
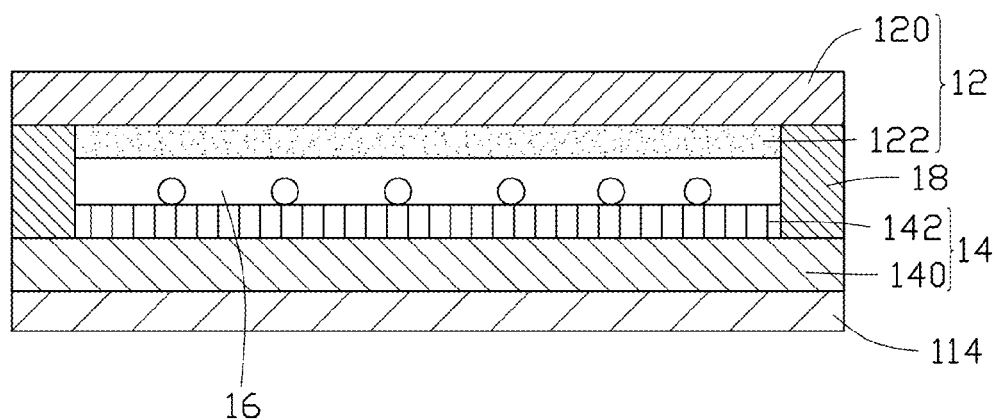
FIG. 6 is similar to FIG. 3 but with an integrated display apparatus.

Referring to FIG. 5, in one embodiment, both the first conductive layer 122 and the second conductive layer 142 are single layered carbon nanotube drawn films. The majority of the carbon nanotubes in the first conductive layer 122 extend along the first direction. Therefore, the conductivity of the first conductive layer 122 in the first direction is much larger than conductivity in other directions. The majority of the carbon nanotubes in the second conductive layer 142 extend along the second direction. Therefore, the conductivity of the second conductive layer 142 in the second direction is much larger than conductivity in other directions. That is, the first conductive layer 122 has a main conductive direction (e.g., X direction, i.e., the lowest impedance direction), and the second conductive layer 142 has a main conductive direction (e.g., Y direction, i.e., the lowest impedance direction). The impedances of the first conductive layer 122 and the second conductive layer 142 in the direction substantially perpendicular to the main conductive direction can be about 100 times to 200 times of those of the first conductive layer 122 and the second conductive layer 142 in the main conductive direction. Because the gaps between the carbon nanotubes in the carbon nanotube drawn film used as the first conductive layer 122 and the second conductive layer 142 are small, the signal value difference of the touch points with different contact areas detected from the driving and sensing circuit can vary noticeably. Therefore, the touch points with different contact areas can be easily distinguished via their detected signal values.

In another embodiment, the first conductive layer 122 and the second conductive layer 142 can include stacked carbon nanotube drawn films. The majority of the carbon nanotubes of the stacked carbon nanotube drawn films in the same conductive layer extend along the same direction.

Both the first substrate 120 and the second substrate 140, as supporters, can be a transparent insulative film or sheet. The first substrate 120 and the second substrate 140 can also be flexible. A material of the first substrate 120 and the second substrate 140 can be glass, quartz, diamond, polycarbonate (PC), polymethyl methacrylate (PMMA), polyethylene terephthalate (PET), polyethersulfones (PES), polyvinylchloride (PVC), benzocyclobutenes (BCB), polyesters, or acrylic resins. The thickness of each of the first substrate 120 and the second substrate 140 can range from about 0.1 millimeters to about 1 centimeter. In one embodiment, the first substrate 120 and the second substrate 140 are made of PET, and each has a thickness of about 2 mm.

A material of the insulative layer 18 and the dot spacers 16 can be insulative resin or other insulative materials. The dot spacers 16 can be made of transparent material. The dot spacers 16 are used to keep the first electrode plate 12 and the second plate 14 electrically isolated if there is no touch on the touch panel 10. The dot spacers 16 keep the first conductive layer 122 and the second conductive layer 142 electrically isolated.

The touch display device 100 can also include an input device 102 adapted to generate the touch trace on the resistive touch panel 10. A variable contact area can be formed when the first conductive layer 122 and the second conductive layer 142 are electrically contacted by using the input device 102 to touch the resistive touch panel 10. The input device 102 can be a stylus with a hard or soft nib, or a finger of a user. The stylus with the soft nib can be similar to a Chinese traditional writing brush which can produce different contact areas with different touch pressures. The variable contact area between the first conductive layer 122 and the second conductive layer 142 is formed due to variable pressure acted on the resistive touch panel 10 by the input device 102. Therefore, the touch points with different contact areas can be generated. The stylus can be made from all kinds of materials and does not need to be conductive or magnetic. The material of the stylus can be an insulative material, such as plastics, resin, glass, or fiber, or a conductive material, such as metal. The first conductive layer 122 can electrically contact the second conductive layer 142 when the stylus acts on the resistive touch panel 10. In one embodiment, the input device 102 is a stylus with a conical soft nib.

In the present disclosure, the term "contact area" is defined as a contact and conducting area between the first conductive layer 122 and the second conductive layer 142 at the touch point in the touch trace. The contact area varies with the pressure produced by the input device 102 or/and a contact size of the input device 102 acted on the resistive touch panel 10. Brush stokes and touch pressure acted on the resistive touch panel 10 can be embodied by the variable contact areas.

The driving and sensing circuit 106 can provide driving signals to the touch panel 104 and detect sensing signals from the driven touch panel 104 to obtain the actual signal value ($V_i$) of the at least one touch point. The driving signals and sensing signals can be voltage signals or current signals. In one embodiment, both the driving signals and sensing signals are voltage signals, the actual signal value ($V_i$) of the at least one touch point is the voltage difference before and after touching the touch panel 104.

The touch display device 100 can also include an analog to digital converter 108 (ADC). The ADC 108 is adapted to convert the detected actual signal values ($V_i$), as a form of electrical signal, to a digital signal value. The digital signal value is transmitted to and processed by the processor 112. In one embodiment, both the actual signal value ($V_i$) and the standard signal value ($V_s$) are digital signal values.

The display apparatus 114 can be adapted to display the touch trace according the position coordinate of the at least one touch point and the calibrated signal value ($V'_i$) thereof. The display apparatus 114 can be spaced or integrated with the touch panel 104. In one embodiment, the display apparatus 114 is integrated with the resistive touch panel 10. More specifically, the display apparatus 114 is against and near the second substrate 140, and disposed on a surface of the second substrate 140 far from the second conductive layer 142. The display apparatus 114 can be a liquid crystal display (LCD), field emission display (FED), plasma display, electro luminescent display (ELD), vacuum fluorescent display (VFD), or a cathode ray tube (CRT) display.

An operation manner of the touch panel 104 can begin with a user touching the touch panel 104 with the input device 102. In one embodiment, the resistive touch panel 10 is touched to deform the first electrode plate 12. The first conductive layer 122 electrically contacts the second conductive layer 142 in at least one touch point. The position coordinate (x, y) of the at least one touch point can be obtained by the following steps:

A1, driving the first electrodes 124 using the driving and sensing circuit 106, and receiving the signal values detected from the second electrodes 144;

A2, finding the largest signal value from the signal values detected from the second electrodes 144, and transmitting the largest signal value to the processor 112 to calculate an x position coordinate of the at least one touch point;

A3, driving the second electrodes 144 using the driving and sensing circuit 106, and receiving the signal values detected from the first electrodes 124;

A4, finding the largest signal value from the signal values detected from the first electrodes 144, and transmitting the largest signal value to the processor 112 to calculate a y position coordinate of the at least one touch point.

In step A2 and A4, a plurality of large signal values can be obtained from the signal values detected when a plurality of touch points are generated on the resistive touch panel 10.

Figure 7:
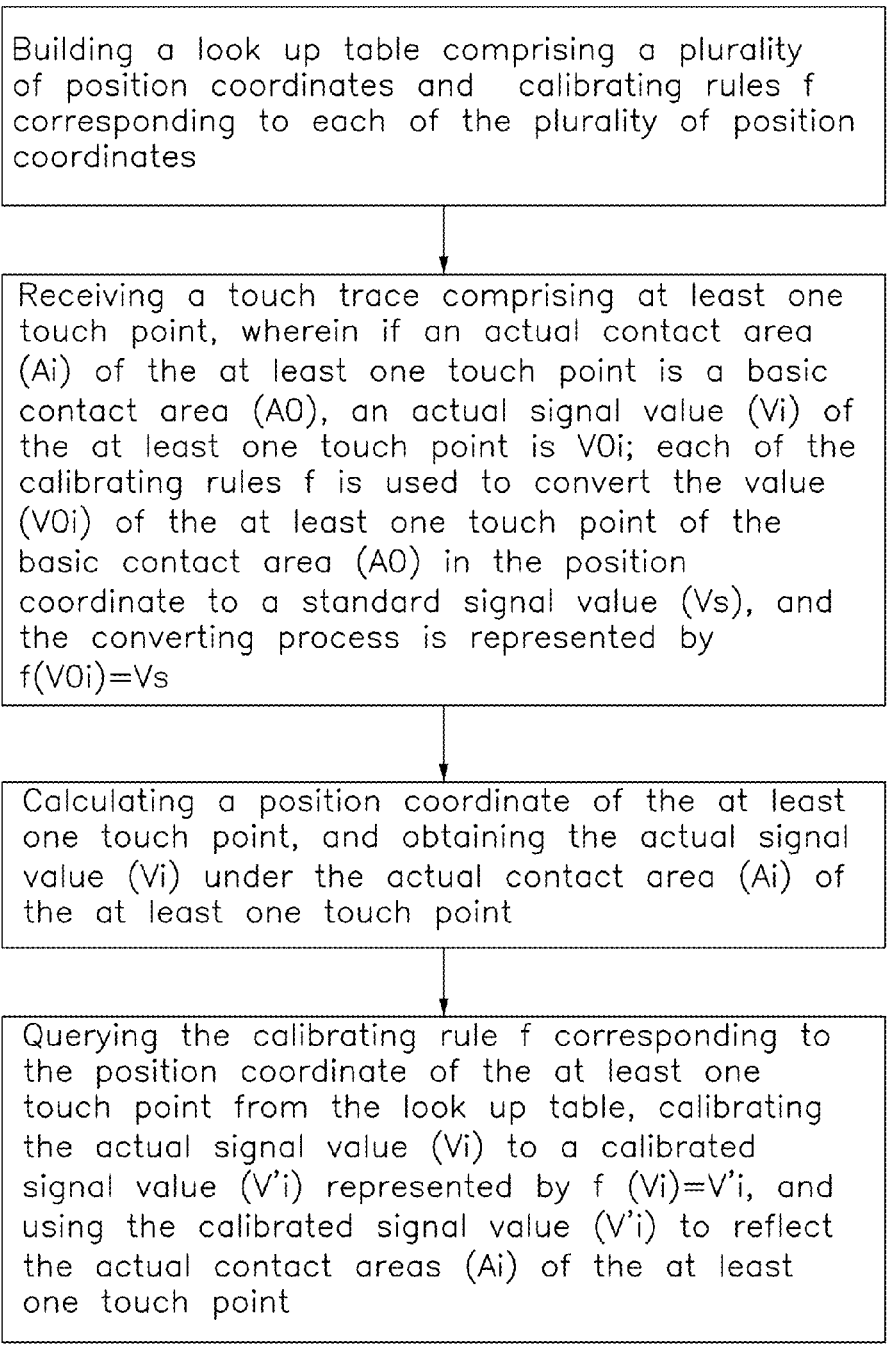
FIG. 7 is a flow chart of an embodiment of a method for detecting touch traces based on the touch display device.

Referring to FIG. 7, one embodiment of a method for detecting the touch trace based on the touch display device 100 includes the following steps:

S1, building the look up table, wherein the look up table includes the plurality of position coordinates and the calibrating rules f corresponding to each of the plurality of position coordinates;

S2, receiving the touch trace including the at least one touch point;

S3, calculating the position coordinate of the at least one touch point, and obtaining the actual signal value ($V_i$) under the actual contact area ($A_i$) of the at least one touch point; and S4, querying the calibrating rule f corresponding to the position coordinate of the at least one touch point from the look up table, calibrating the actual signal value ($V_i$) to the calibrated signal value ($V'_i$) represented by f ($V_i$)=$V'_i$, and using the calibrated signal value ($V'_i$) to reflect the actual contact areas ($A_i$) of the at least one touch point.

Figure 8:
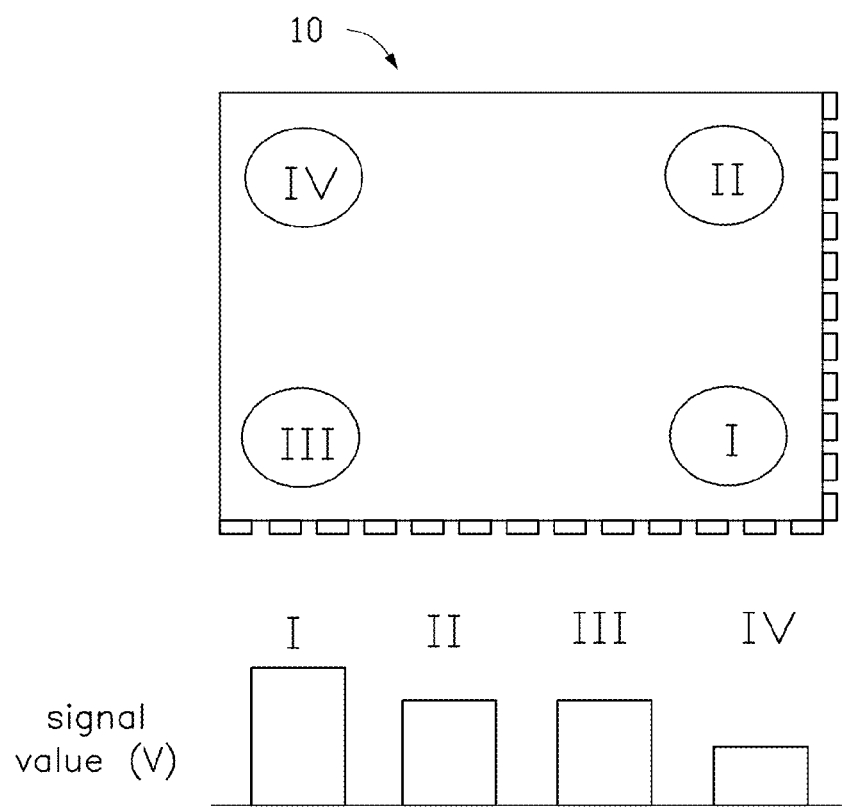
FIG. 8 is a schematic view of signal values of touch points with the same contact areas in different positions of the resistive touch panel.
Figure 9:
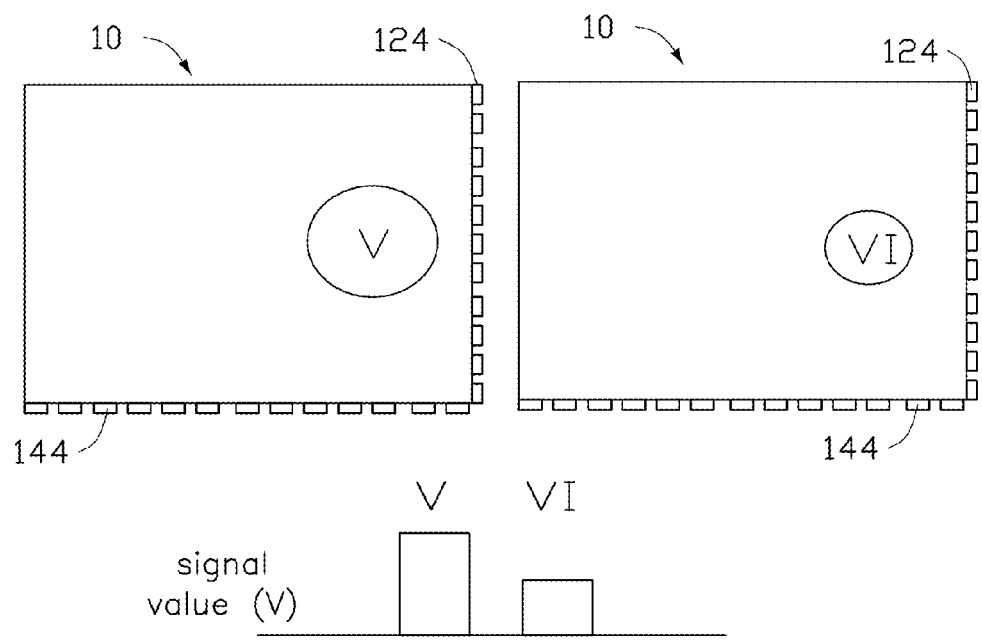
FIG. 9 is another schematic view of signal values of touch points with different contact areas in the same position of the resistive touch panel.

In practical application, a touch point with a constant contact area in different positions of the resistive touch panel 10 has a different signal value detected. Specifically, in the X or Y direction, the closer the touch points to the electrodes, the larger the signal value of the touch point detected. On the contrary, the farther the touch points to the electrodes, the smaller the signal value of the touch point detected. Referring to FIG. 8, for example, there are four touch points with the same contact areas in different position of the touch panel 10. The four touch points are numbered as I, II, III, and IV. The touch point I is the nearest to the electrodes in both the X and Y directions, so the signal value of the touch point I detected is the largest. The touch point IV is the farthest from the electrodes in the X and Y direction. The signal value of the touch point IV detected is the smallest. Similarly, a touch point with different contact areas in a constant position of the resistive touch panel 10 also has different signal values detected. Referring to FIG. 9, for example, touch points V and VI are in the same position on the resistive touch panel 10. A contact area of the touch point V is larger than a contact area of the touch point VI, so a signal value of the touch point V detected is larger than a signal value of the touch point VI. Based on the above facts of FIG. 8 and FIG. 9, the calibrated signal value ($V'_i$) of the at least one touch point is used to directly reflect the actual contact area ($A_i$) of the at least one touch point. The calibrated signal value ($V'_i$) can be related to the actual contact area of the at least one touch point, and unrelated to the position coordinate of the at least one touch point. In the present disclosure, the constant position refers to the same position coordinates of the touch points, and different position refers to different position coordinates of the touch points.

Figure 10:
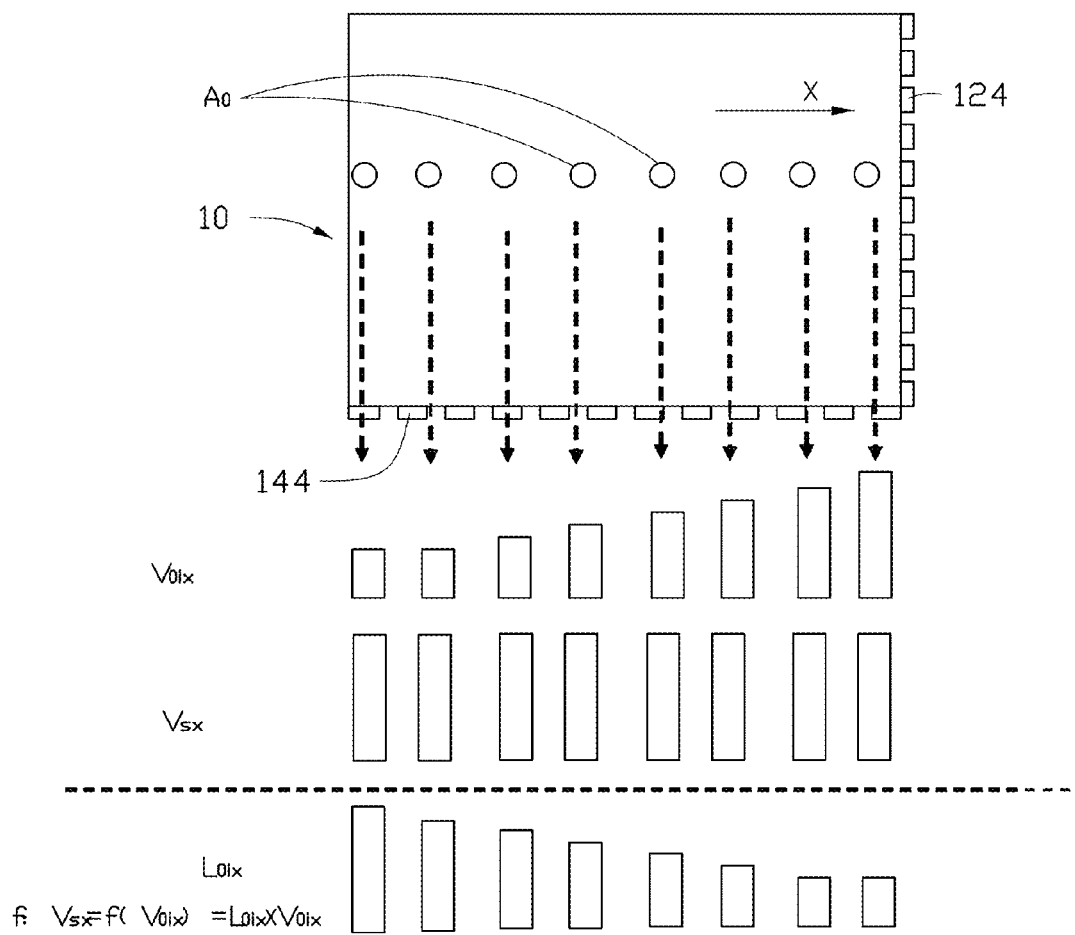
FIG. 10 is a schematic view of a calibration process of an actual signal value ($V_{oix}$) in an X direction of a touch point in a base contact area to a standard signal value ($V_{sx}$) in the X direction.
Figure 11:
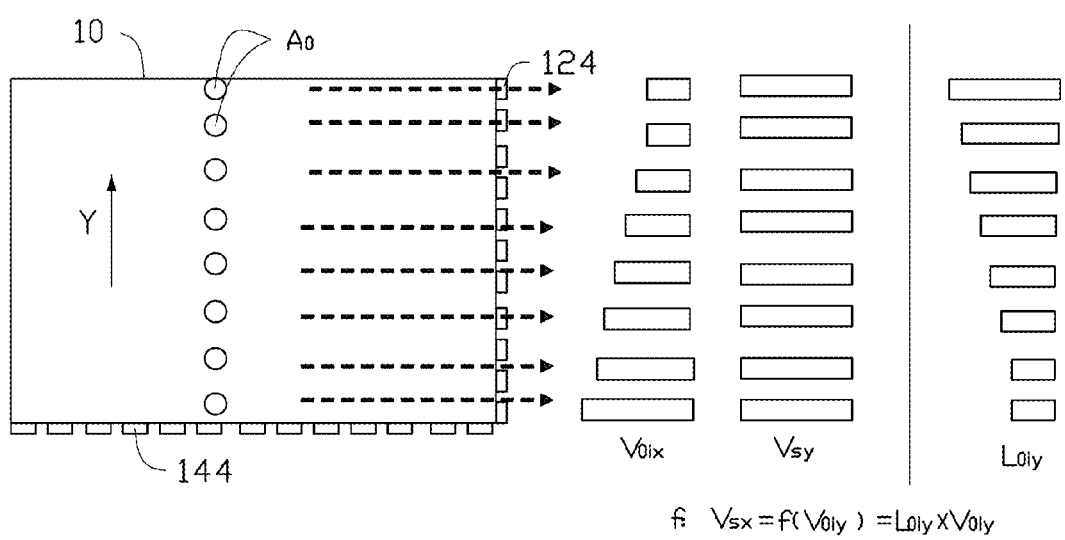
FIG. 11 is a schematic view of a calibration process of the actual signal value ($V_{oiy}$) in a Y direction of the touch point in the base contact area to the standard signal value ($V_{sy}$) in the Y direction.

Referring to FIG. 10 and FIG. 11, the look up table of step S1 can be built by the following steps:

S11, setting the base contact area ($A_0$);

S12, obtaining the actual signal values ($V_{0i}$) of a plurality of touch points of the base contact area ($A_0$), wherein $V_{0i}$ can be represented by: $V_{0i}=(V_{0ix}, V_{0iy})$, $V_{0ix}$, represents actual signal values in the X direction, and $V_{0iy}$ represents actual signal values in the Y direction;

S13, defining the standard signal value ($V_s$), wherein $V_s$ can be represented by: $V_s=(V_{sx}, V_{sy})$, $V_s$, represents the standard signal value in the X direction, and $V_{sy}$ represents standard signal value in the Y direction; and S14, building the calibrating rules f to convert $V_{0i}$ to $V_s$, wherein $f(V_{0ix})=V_{sx}$ and $f(V_{0iy})=V_{sy}$.

Symbol i represents one touch point in the touch trace. In one embodiment, the symbol i represents not only one touch point in the touch trace and also a order of the touch points generated, i=1, 2, 3 . . . , wherein i is equal to or larger than 0.

In step S11, the base contact area ($A_0$) can be set according to the size of the resistive touch panel 10.

In step S12, a quantity of the plurality of touch points with the base contact area ($A_0$) can be equal to a quantity of all position coordinates of the resistive touch panel 10. The plurality of touch points with the base contact area ($A_0$) can be formed on all positions of the resistive touch panel 10 in order. Each actual signal value ($V_{0i}$) of each of the plurality of touch points are detected by the driving and sensing circuit 106.

In another embodiment, the plurality of touch points with the base contact area ($A_0$) can be formed on some sampled positions of the resistive touch panel 10, and the signal values ($V_{0i}$) and position coordinates of the touch points in the sampled positions are detected. Signal values ($V_{0i}$) of the touch points in un-sampled positions can be calculated by interpolation according to a relationship between the sampled positions coordinates and the un-sampled position coordinates. In one embodiment, a part of the signal values ($V_{0i}$) of the touch points with the base contact area ($A_0$) are detected and the other part of the signal values ($V_{0i}$) are calculated by interpolation according to the relationship between the sampled positions coordinates and the un-sampled position coordinates.

In step S13, the standard signal value ($V_s$) can be used as a criteria for adjusting all the signal values ($V_{0i}$) of the touch points under the base contact area ($A_0$) to be equal. In one embodiment, the maximum value of all signal values ($V_{0i}$) can be selected as the standard signal value ($V_s$). When the touch trace is displayed on the display apparatus 114, the standard signal value ($V_s$) can be considered as a criteria of a displayed diameter or area of the touch point under the base contact area ($A_0$).

In step S14, a purpose of building the calibrating rules f is to bridge the actual signal values ($V_{0i}$) of the touch points with their base contact areas ($A_0$). Specifically, the signal values ($V_{0i}$) of the touch points under the base contact area ($A_0$) are defined as the standard signal value ($A_s$). The standard signal value ($V_s$) can be used to reflect the base contact area ($A_0$) with no need for considering the position coordinates of the touch points. Similarly, the calibrated signal values ($V'_i$) can be used to reflect the actual contact area ($A_i$).

The calibrating rules f can be built using various algorithms as long as the calibrating rules f meets the conditions: $f(V_{0i})=V_s$. In one embodiment, the calibrating rules f reflect a ratio of the standard signal value ($V_s$) to the actual signal values ($V_{0i}$) which can be represented by $L_{0i} \times V_{0i}=V_s$, wherein $L_{0i}$ is a coefficient of $V_{0i}$ for converting into $V_s$, and $L_{0i}$ is represented by $L_{0i}=(L_{0ix}, L_{0iy})$, wherein $L_{0ix} \times V_{0ix}=V_{sx}$, and $L_{0iy} \times V_{0iy}=V_{sy}$.

Figure 12:
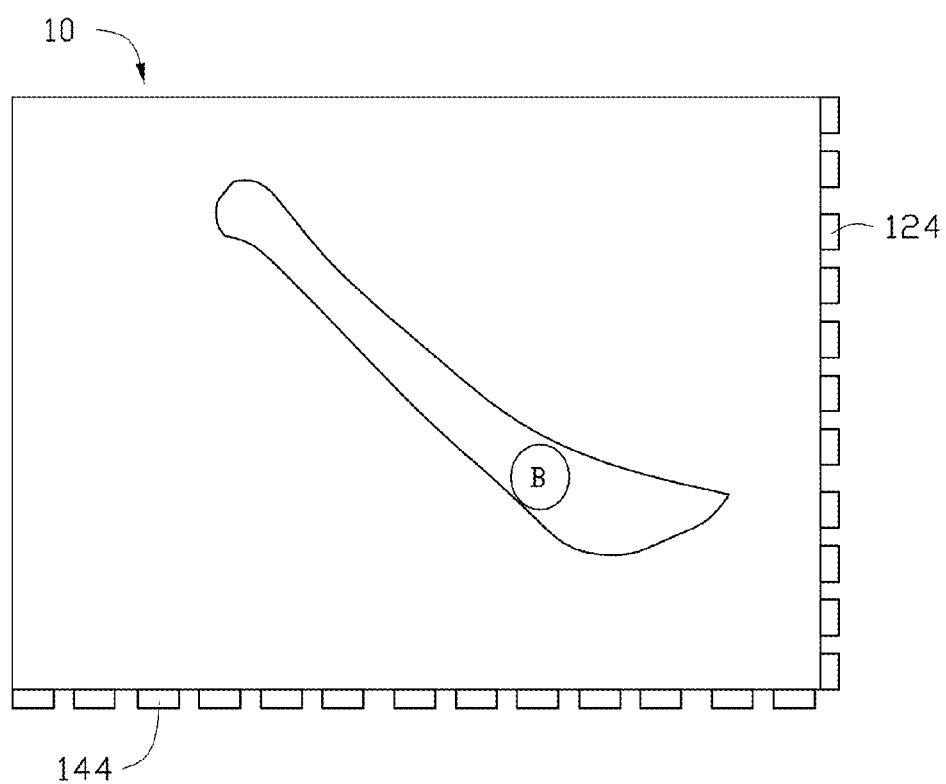
FIG. 12 is a schematic view of the touch trace generated on the touch display device.

In step S2, the touch trace can be a single touch point or a plurality of ordered touch points formed by the input device 102 sliding on the resistive touch panel 10. In one embodiment, the touch trace includes the plurality of touch points. Referring to FIG. 12, the touch trace is a handwriting consisting of a plurality of successive touch points formed by using a stylus with a conical soft nib.

In step S3, the actual signal value ($V_i$) under the actual contact area ($A_i$) of the at least one touch point can be obtained by the driving and sensing circuit 106. The position coordinate of the at least one touch point can be calculated by the processor 112 according to the actual signal value ($V_i$) thereof. The actual signal value ($V_i$) can be represented by $V_i=(V_{ix}, V_{iy})$, wherein $V_{ix}$ represents the actual signal value in the X direction, and $V_{iy}$ represents the actual signal value in the Y direction. In one embodiment, the touch trace includes the plurality of touch points, and the actual signal value ($V_i$) of each of the plurality of touch points is detected.

The actual signal value (Vi) can be the largest signal value detected from the electrodes of the resistive touch panel 10. The actual signal value (Vi) also can be a plurality of signal values detected including and adjacent to the largest signal value. The different actual contact areas vary obviously with the plurality of signal values detected including and adjacent to the largest signal value after calibrating. Therefore the plurality of signal values including and adjacent to the largest signal value selected as the actual signal value (Vi) after the calibrating of step S4 can reflect the actual contact area (Ai) of the at least one touch point more accurately. Therefore, the touch trace can be displayed more accurately. In one embodiment, the pluralities of signal values including and adjacent to the largest signal value are selected as the actual signal value (Vi). The position coordinate of the at least one touch point can be obtained by the following steps:

S31, driving the plurality of first electrodes 124, and detecting a plurality of the actual signal values ($V_{ix}$) from the plurality of second electrodes 144, and simulating a first curve according to the plurality of the actual signal values ($V_{ix}$), and calculating the position coordinate in the X direction according to the maximum value in the first curve; and S32, driving the plurality of the second electrodes 144, and detecting a plurality of the actual signal values ($V_{iy}$) from the plurality of first electrodes 124, and simulating a second curve according to the plurality of the actual signal ($V_{iy}$), and calculating the position coordinate in the Y direction according to the maximum value in the second curve.

Signal values mentioned in the present disclosure, such as $V_{0i}$, $V_i$, $V_{ix}$, and $V_{iy}$, all refer to a signal value difference before and after touching the touch panel 10.

In step S31 and S32, when there are touches on the touch panel 10, the signal value difference of the touch point in the corresponding electrode is larger than the signal value differences detected from other electrodes. The position coordinate (x, y) can be calculated according to a distance of the corresponding electrodes from the touch point.

In step S4, the plurality of signal values including the largest signal value and the signal values adjacent to the largest signal value selected as the actual signal value ($V_i$) can be calibrated. The calibrated signal value ($V'_i$) can be represented by $V'_i=(V'_{ix}, V'_{iy})$, wherein $V'_{ix}=L_{0ix} \times V_{ix}$ and $V'_{iy}=L_{0iy} \times V_{iy}$.

The calibrated signal value ($V'_i$) is a two-dimensional value including $V'_{ix}$ and $V'_{iy}$. To reflect the calibrated signal value ($V'_i$) more directly, the two dimensional value of the calibrated signal value ($V'_i$) can be converted to a one-dimensional calibrated value ($V'_{i-total}$) by using an operating rule g. A relationship between the operating rule g and the one-dimensional calibrated value ($V'_{i-total}$) can be represented by $g(V'_{ix}, V'_{iy})=V'_{i-total}$. $V'_{i-total}$ is a comprehensive value of the calibrated signal value ($V'_i$) in the X and Y direction. The operating rule g is an algorithm between $V'_{ix}$ and $V'_{iy}$, such as sum and product. In one embodiment, $V'_{i-total}$ is the sum of the $V'_{ix}$ and $V'_{iy}$ represented by $V'_{i-total}=V'_{ix}+V'_{iy}$. The $V'_{i-total}$ can also be represented by $V'_{t-total}=V'_{ix} \times V'_{iy}$ or other algorithms.

Figure 13:
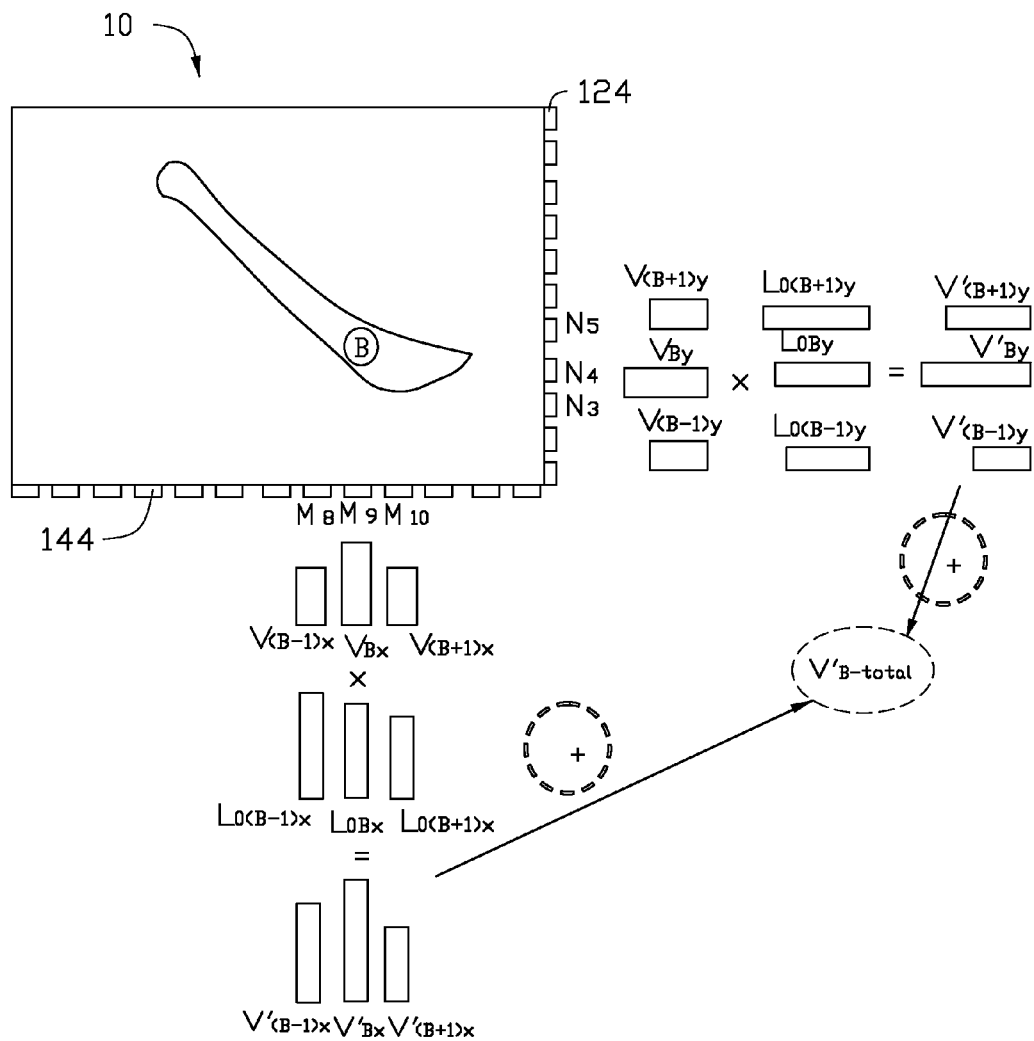
FIG. 13 is a schematic view of a calibration process of an actual signal value of one touch point labeled B in the touch trace of FIG. 12.

Referring to FIG. 13, the calibrating process of a touch point labeled B is specified as an example of the other touch points in the touch trace. The electrode corresponding to the position coordinate in the X direction is the second electrode labeled $M_9$, and the electrode corresponding to the position coordinate in the Y direction is the second electrode labeled $N_4$. The electrodes $M_8$ and $M_{10}$ are adjacent to the electrode $M_9$, and the electrodes $N_3$ and $N_5$ are adjacent to the electrode $N_4$. The actual signal values in the electrodes $M_8$, $M_9$, $M_{10}$, $N_3$, $N_4$, and $N_5$ are detected for calibrating. In another embodiment, additional actual signal values can be detected from additional first electrodes 124 and second electrodes 144 for a more accurate calibrated signal value of the touch point B. The calibrating process of the touch point B includes the following steps:

B41, calibrating the actual signal values in the X direction detected from the second electrode $M_9$ corresponding to the touch point B and from the adjacent second electrodes $M_8$ and $M_{10}$ by using the calibrating rule f; the calibrated signal values in the X direction can be represented by: $V'_{Bx}=L_{0Bx} \times V_{Bx}$, $V'_{(B-1)x}=L_{0(B-1)x} \times V_{(B-1)x}$, and $V'_{(B+1)x}=L_{0(B+1)x} \times V_{(B+1)x}$, wherein $V_{Bx}$ is the actual signal value detected from the electrode $M_9$, $V'_{Bx}$ is the calibrated signal value of $V_{Bx}$, and $L_{0BX}$ is the coefficient of $V_{Bx}$; $V_{(B-1)x}$ is the actual signal value detected from the electrode $M_8$, $V'_{(B-1)x}$ is the calibrated signal value of $V_{(B-1)x}$, and $L_{0(B-1)x}$ is the coefficient of $V_{(B-1)x}$; and $V_{(B+1)x}$ is the actual signal value detected from the electrode $M_{10}$, $V'_{(B+1)x}$ is the calibrated signal value of $V_{(B+1)x}$, and $L_{0(B+1)x}$ is the coefficient of $V_{(B+1)x}$.

B42, calibrating the actual signal values in the Y direction detected from the first electrode $N_4$ corresponding to the touch point B and from the adjacent first electrodes $N_3$ and $N_5$ by using the calibrating rule f; the calibrated signal values in the Y direction can be represented by: $V'_{By}=L_{0By} \times V_{By}$, $V'_{(B-1)y}=L_{0(B-1)y} \times V_{(B-1)y}$, and $V'_{(B+1)y}=L_{0(B+1)y} \times V_{(B+1)y}$, wherein $V_{By}$ is the actual signal value detected from the electrode $N_4$, $V'_{By}$ is the calibrated signal value of $V_{By}$, and $L_{0By}$ is the coefficient of $V_{By}$; $V_{(B-1)y}$ is the actual signal value detected from the electrode $N_3$, $V'_{(B-1)y}$ is the calibrated signal value of $V_{(B-1)y}$, and $L_{0(B-1)y}$ is the coefficient of $V_{(B-1)y}$; and $V_{(B+1)y}$ is the actual signal value detected from the electrode $N_5$, $V'_{(B+1)y}$ is the calibrated signal value of $V_{(B+1)y}$, and $L_{0(B+1)y}$ is the coefficient of $V_{(B+1)y}$; and B43, calculating the one-dimensional calibrated value ($V'_{B-total}$) of the touch point B represented by: $V'_{B-total}=V'_{Bx}+V'_{By}+V'_{(B-1)x}+V'_{(B-1)y}+V'_{(B+1)x}+V'_{(B+1)y}$.

The one-dimensional calibrated value ($V'_{i-total}$) of f the one touch point can further be restricted to an output signal value ($V_{i-output}$) to save the data storage space of the data memory 110. The restricting process can include the following steps:

B431, defining an output range ($V_{down}$, $V_{up}$) and an output digit t, wherein t is a natural number;

B432, judging the one-dimensional calibrated value ($V'_{i-total}$) whether in the output range ($V_{down}$, $V_{up}$):

if in the range, outputting the output signal value ($V_{i-output}$) as $$V_{i-output} = \left( \frac{V'_{i-total} - V_{down}}{V_{up} - V_{down}} \right) \times 2^t;$$

if $V_{i-output} < V_{down}$, outputting the output signal value ($V_{i-output}$) as $V_{i-output}=0$; or outputting the output signal value ($V_{i-output}$) as $V_{i-output}=2^{t-1}$.

In step B431, the output range ($V_{down}$, $V_{up}$) can correspond to the output digital t, such as $V_{i-output}$ being restricted by the output digit t to make the $V_{i-output}$ be in the output range of 0 to $2^t-1$. In one embodiment, the digit t is equal to 8.

The method for detecting the touch trace based on the touch display device 100 can further include displaying the touch trace according to the position coordinate and the calibrated signal value of the each touch point in the touch trace.

A trajectory of the touch trace can be displayed according to the position coordinate of each touch point in the touch trace. A size of the touch trace can be displayed according to the calibrated signal value of each touch point.

The trajectory only reflects the position of each of the touch points in the touch trace. The size of the touch trace refers to a displayed diameter of each touch point or quantities of displayed pixels of each touch point. The touch trace can be one point, a line, or curve including a plurality of touch points. If the touch trace is one touch point, the trajectory refers to the position of the point. If the touch trace is the line or curve, the trajectory refers to a line or curve formed by the positions of the plurality of the touch points. The calibrated signal value used to display the size of the touch trace (the displayed diameter of each touch point) can be the $V'_i$, $V'_{i-total}$, or $V_{i-output}$. In one embodiment, the output signal value ($V_{i-output}$) is used to reflect the displayed diameter of each touch point in the touch trace.

A relationship between the calibrated signal value and the displayed diameter of each touch point in the touch trace can be built. In one embodiment, the relationship can be built in the following steps:

C1, pre-defining the displayed diameter of a touch point as $D_0$, wherein the signal value of the touch point is the standard signal value ($V_s$) and the contact area of the touch point is the base contact area ($A_0$);

C2, confirming a corresponding rule k between the displayed diameter ($D_0$) of the standard signal value ($V_s$) and a displayed diameter ($D_i$) of the output signal value ($V_{i-output}$), wherein the larger the output signal value ($V_{i-output}$) is, the larger the displayed diameter ($D_i$); and C3, calculating the displayed diameter ($D_i$) of the output signal value ($V_{i-output}$) according to the corresponding rule k.

In step C2, in one embodiment, the corresponding rule k is represented by: $D_i=k(V_{i-output}, V_s, D_0)=(V_{i-output}/V_s) \times D_0$.

In step C3, the size of the touch trace can be reflected by all displayed diameters ($D_i$) of the touch points in the touch trace.

Each touch point in the touch trace includes two parameters, one parameter is the position coordinate, and the other parameter is the output signal value ($V_{i-output}$). The output signal value ($V_{i-output}$) can be used as a standard of the displayed diameter ($D_i$) of each touch point. Therefore, touch traces with different sizes can be displayed. The touch trace can be saved in the data memory 110 as an electronic signature in the form of a picture.

The touch display device 100 can realize a display of touch traces with different sizes. In present disclosure, the position coordinate and the actual signal value of the each touch point of the touch trace are obtained. A relationship is established to connect the actual signal value with the actual contact area via the calibrated signal value of each touch point. In the relationship, the touch points with the same contact area have the same calibrated signal values, and the touch points with different contact areas have different calibrated signal values. The calibrated signal value of each touch point can be used to confirm the displayed diameters thereofherefore, the display of different sized touch traces can be realized. The touch display device 100 can be broadly used for electronic signature and electronic painting. The touch display device 100 can create a better user experience.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A touch display device comprising:
   a touch panel receiving a touch trace formed by touching the touch panel, wherein the touch trace comprises at least one touch point;
   a driving and sensing circuit driving the touch panel and sensing an actual signal value $V_i$ of the at least one touch point, wherein if an actual contact area $A_i$ of the at least one touch point is a basic contact area Ao, the actual signal value $V_i$ of the at least one touch point is $V_{oi}$;
   a data memory storing a look up table comprising a plurality of position coordinates on the touch panel and a plurality of calibrating rules f, each of the calibrating rules f corresponding to each of the plurality of the position coordinates, and used to convert the $V_{oi}$ of the at least one touch point of the basic contact area $A_o$ in its position coordinate to a standard signal value $V_s$, wherein the converting process is represented by $f(V_{oi})=V_s$, the calibrating rules f performing a function of $V_{oi}$;
   a processor calculating the position coordinate and calibrating the actual signal value $V_i$ of the at least one touch point to a calibrated signal value $V'_i$ by the each corresponding calibrating rule f, wherein the calibrating process is represented by $f(V_i)=V'_i$; and wherein the calibrated signal value $(V'_i)$ is related to the actual contact area of the at least one touch point, and unrelated to the position coordinate of the at least one touch point and
   a display apparatus displaying the touch trace according to the position coordinate and the calibrated signal value V', of the at least one touch point calculated by the processor.

2. The touch display device of claim 1 further comprising an input device generating the touch trace on the touch panel.

3. The touch display device of claim 1 further comprising an analog to digital convertor converting the actual signal value $V_i$, from an electrical signal to a digital signal value.

4. The touch display device of claim 1, wherein the processor calibrates a plurality of the actual signal values V, from an electrode of the touch panel corresponding to the at least one touch point and its adjacent electrodes.

5. The touch display device of claim 1, wherein the touch panel is a multi-touch resistive touch panel.

6. The touch display device of claim 5, wherein the multi-touch resistive touch panel comprises at least one first electrode plate comprising a first conductive layer and a plurality of first electrodes, a second electrode plate comprising a second conductive layer and a plurality of second electrodes, and a plurality of dot spacers disposed between the first conductive layer and the second conductive layer, each of the first conductive layer and the second conductive layer being a transparent and anisotropic conductive film.

7. The touch display device of claim 6, wherein the transparent and anisotropic conductive film is a carbon nanotube film comprising a plurality of carbon nanotubes.

8. The touch display device of claim 7, wherein the carbon nanotube film is a carbon nanotube drawn film formed by drawing a carbon nanotube array.

9. The touch display device of claim 8, wherein uniform gaps are formed between the carbon nanotubes, and a width of each of the gaps is in a range from about 1 nanometer to about 10 micrometers.

10. The touch display device of claim 8, wherein a majority of the carbon nanotubes in the carbon nanotube drawn film extend substantially along a same direction and is parallel to a surface of the carbon nanotube drawn film.

11. The touch display device of claim 10, wherein an end of each of the carbon nanotubes in the majority of the carbon nanotubes is joined to another end of an adjacent carbon nanotube arranged substantially along the same direction by van der Waals attractive force.

12. The touch display device of claim 10, wherein the plurality of first electrodes is separately located on and electrically connected with at least one end along a second direction of the first conductive layer; the plurality of second electrodes is separately located on and electrically connected with at least one end along a first direction of the second conductive layer; the first direction is substantially perpendicular to the second direction; the majority of the carbon nanotubes in the first conductive layer integrally extends along the first direction and is electrically connected with the plurality of first electrodes; and the majority of the carbon nanotubes in the second conductive layer integrally extends along the second direction and is electrically connected with the plurality of second electrodes.

13. The touch display device of claim 12, wherein the first direction is defined as an X direction, the second direction is defined as a Y direction; $V_{0i}$ is represented by: $V_{0i}=(V_{0ix}, V_{0iy})$, wherein $V_{0ix}$ represents signal values in the X direction, and $V_{0iy}$ represents signal values in the Y direction; $V_s$ is represented by: $V_s=(V_{sx}, V_{sy})$, wherein $V_{sx}$ represents the standard signal value in the X direction, and $V_{sy}$ represents the standard signal value in the Y direction; and $f(V_{0i})=V_s$ comprises $f(V_{0ix})=V_{sx}$ and $f(V_{0iy})=V_{sy}$.

14. The touch display device of claim 13, wherein each of the calibrating rules f is represented by $f(V_{0i})=L_{0i} \times V_{0i}=V_s$, wherein $L_{0i}$ is a coefficient of $V_{0i}$ for converting into $V_s$, and $L_{0i}$ is represented by $L_{0i}=(L_{0ix}, L_{0iy})$, $L_{0ix}$ is the coefficient of the X direction, and $L_{0iy}$ is the coefficient of the Y direction; and $L_{0ix} \times V_{0ix}=V_{sx}$, and $L_{0iy} \times V_{0iy}=V_{sy}$.

15. The touch display device of claim 1, wherein the data memory stores an operating rule g that converts the calibrated signal value $V'_i$ to a one-dimensional calibrated value $V'_{i\text{-}total}$, the converting process is represented by $g(V'_{ix}, V'_{iy})=V'_{i\text{-}total}$, wherein the calibrated signal value $V'_i$ is represented by $V'_i=(V'_{ix}, V'_{iy})$, $V'_{ix}$ represents the calibrated signal value in the X direction and $V'_{iy}$ represents the calibrated signal value in the Y direction.

16. The touch display device of claim 15, wherein $V'_{i\text{-}total}$ is a sum of the calibrated signal value in the X direction $V'_{ix}$ and the calibrated signal value in the Y direction $V'_{iy}$ represented by $V'_{i\text{-}total}=V'_{ix}+V'_{iy}$.

17. The touch display device of claim 16, wherein the one-dimensional calibrated value $V'_{i\text{-}total}$ is further restricted to an output signal value $V_{i\text{-}output}$, the restricted process comprises the following steps:
   defining an output range $(V_{down}, V_{up})$ and an output digit t, wherein t is a natural number;
   judging whether the one-dimensional calibrated value $V'_{i\text{-}total}$ is in the output range $(V_{down}, V_{up})$:
   if the one-dimensional calibrated value $V'_{i\text{-}total}$ is in the range, outputting the output signal value $$V_{i-output} \text{ as } V_{i-output} = \left(\frac{V'_{i-total} - V_{down}}{V_{up} - V_{down}}\right) \times 2^t;$$

if $V_{i-output} < V_{down}$, outputting the output signal value $V_{i-output}$ as $V_{i-output}=0$; or outputting the output signal value $V_{i-output}$ as $V_{i-output}=2^{t-1}$.

18. The touch display device of claim 17, wherein the output signal value $V_{i-output}$ reflects a displayed diameter $D_i$ of the at least one touch point in the touch trace, the reflecting process comprises:

pre-defining a displayed diameter of a touch point as $D_0$, wherein the signal value of the touch point is the standard signal value $V_s$ and the contact area of the touch point is the base contact area $A_0$;

confirming a corresponding rule k stored by the data memory between the displayed diameter $D_0$ of the standard signal value $V_s$ and the displayed diameter $D_i$ of the output signal value $V_{i-output}$, wherein the larger the output signal value $V_{i-output}$, the larger the displayed diameter $D_i$; and calculating the displayed diameter $D_i$ of the output signal value $V_{i-output}$ according to the corresponding rule k.

19. A touch display device comprising:

a touch panel receiving a touch trace formed by touching the touch panel, wherein the touch trace comprises at least one touch point;

a driving and sensing circuit driving the touch panel and sensing an actual signal value $V_i$ of the at least one touch point, wherein if an actual contact area $A_i$ of the at least one touch point is a basic contact area $A_0$, the actual signal value $V_i$ of the at least one touch point is $V_{0i}$;

a data memory storing a look up table comprising a plurality of position coordinates on the touch panel and a plurality of calibrating rules f, each of the calibrating rules f corresponding to each of the plurality of the position coordinates, and used to convert the $V_{0i}$ of the at least one touch point of the basic contact area $A_0$ in its position coordinate to a standard signal value $V_s$, wherein the converting process is represented by $f(V_{0i})=V_s$, the calibrating rules f performing a function of $V_{0i}$;

a processor calculating the position coordinate and calibrating the actual signal value $V_i$ of the at least one touch point to a calibrated signal value $V'_i$ by the each corresponding calibrating rule f, wherein the calibrating process is represented by $f(V_i)=V'_i$; and a display apparatus displaying the touch trace according to the position coordinate and the calibrated signal value $V'_i$ of the at least one touch point calculated by the processor;

wherein the data memory further stores an operating rule g that converts the calibrated signal value $V'_i$ to a one-dimensional calibrated value $V'_{i-total}$, the converting process is represented by $g(V'_{ix}, V'_{iy})=V'_{i-total}$, wherein the calibrated signal value $V'_i$ is represented by $V'_i=(V'_{ix}, V'_{iy})$, $V'_{ix}$ represents the calibrated signal value in the X direction and $V'_{iy}$ represents the calibrated signal value in the Y direction; wherein $V'_{i-total}$ is a sum of the calibrated signal value in the X direction $V'_{ix}$ and the calibrated signal value in the Y direction $V'_{iy}$ represented by $V'_{i-total}=V'_{ix}+V'_{iy}$; the one-dimensional calibrated value $V'_{i-total}$ is further restricted to an output signal value $V_{i-output}$, the restricted process comprises the following steps:

defining an output range $(V_{down}, V_{up})$ and an output digit t, wherein t is a natural number;

judging whether the one-dimensional calibrated value $V'_{i-total}$ is i in the output range $(V_{down}, V_{up})$:

if the one-dimensional calibrated value $V'_{i-total}$ is in the range, outputting the output signal value $$V_{i-output} \text{ as } V_{i-output} = \left(\frac{V'_{i-total} - V_{down}}{V_{up} - V_{down}}\right) \times 2^t;$$

if $V_{i-output} < V_{down}$, outputting the output signal value $V_{i-output}$ as $V_{i-output}=0$; or outputting the output signal value $V_{i-output}$ as $V_{i-output}=2^{t-1}$;

wherein the output signal value $V_{i-output}$ reflects a displayed diameter $D_i$ of the at least one touch point in the touch trace, the reflecting process comprises:

pre-defining a displayed diameter of a touch point as $D_0$, wherein the signal value of the touch point is the standard signal value $V_s$ and the contact area of the touch point is the base contact area $A_0$;

confirming a corresponding rule k stored by the data memory between the displayed diameter $D_0$ of the standard signal value $V_s$ and the displayed diameter $D_i$ of the output signal value $V_{i-output}$, wherein the larger the output signal value $V_{i-output}$, the larger the displayed diameter $D_i$; and calculating the displayed diameter $D_i$ of the output signal value $V_{i-output}$ according to the corresponding rule k, wherein the corresponding rule k meets $D_i=k(V_{i-output}, V_s, D_0)=(V_{i-output}/V_s) \times D_0$.

* * * * *